United States Patent
Herbert et al.

(10) Patent No.: US 10,754,703 B2
(45) Date of Patent: Aug. 25, 2020

(54) TRUSTED COMPUTING RESOURCE METER

(71) Applicant: McAfee, LLC, Santa Clara, CA (US)

(72) Inventors: Howard C. Herbert, Gilbert, AZ (US); Jennifer Eligius Mankin, San Jose, CA (US); Simon Hunt, Naples, FL (US); Venkata Ramanan Sambandam, Sunnyvale, CA (US); Mark E. Scott-Nash, Boulder, CO (US); Katalin Klara Bartfai-Walcott, El Dorado Hills, CA (US); Rameshkumar Illikkal, Folsom, CA (US)

(73) Assignee: McAfee, LLC, Santa Clara, CA (US)

( * ) Notice: Subject to any disclaimer, the term of this patent is extended or adjusted under 35 U.S.C. 154(b) by 26 days.

(21) Appl. No.: 14/977,952

(22) Filed: Dec. 22, 2015

(65) Prior Publication Data
US 2017/0177417 A1    Jun. 22, 2017

(51) Int. Cl.
| | | |
|---|---|---|
| *G06F 9/50* | (2006.01) | |
| *G06F 11/30* | (2006.01) | |
| *G06F 11/34* | (2006.01) | |
| *H04L 12/911* | (2013.01) | |

(52) U.S. Cl.
CPC ............ *G06F 9/5083* (2013.01); *G06F 9/505* (2013.01); *G06F 9/5072* (2013.01); *G06F 11/302* (2013.01); *G06F 11/3006* (2013.01); *G06F 11/3062* (2013.01); *G06F 11/3409* (2013.01); *H04L 47/822* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 7,702,779 B1 | 4/2010 | Gupta et al. | |
| 2010/0228861 A1* | 9/2010 | Arsovski | G06F 9/5027 709/226 |
| 2011/0154353 A1 | 6/2011 | Theroux et al. | |

(Continued)

FOREIGN PATENT DOCUMENTS

WO    2017112169 A1    6/2017

OTHER PUBLICATIONS

International Search Report and Written Opinion issued in PCT Application No. PCT/US2016/062638 dated Feb. 23, 2017; 12 pages.

*Primary Examiner* — Lewis A Bullock, Jr.
*Assistant Examiner* — Melissa A Headly
(74) *Attorney, Agent, or Firm* — Patent Capital Group

(57) ABSTRACT

In an example, there is disclosed a computing apparatus, having a computing resource; a bespoke sensor for measuring at least one parameter of usage of the computing resource; and one or more logic elements providing a trusted compute meter (TCM) agent to: receive an external workload; provision a workload enclave; execute the external workload within the TCM enclave; and measure resource usage of the external workload via the bespoke sensor. There is also disclosed a computer-readable medium having stored thereon executable instructions for providing a TCM agent, and a method of providing a TCM agent.

23 Claims, 8 Drawing Sheets

(56) References Cited

U.S. PATENT DOCUMENTS

| | | | |
|---|---|---|---|
| 2012/0173708 A1* | 7/2012 | Bartfai-Walcott | G06F 9/5072 709/224 |
| 2012/0304254 A1* | 11/2012 | Musfeldt | H04L 9/3234 726/2 |
| 2014/0136707 A1 | 5/2014 | Beaty et al. | |
| 2014/0157410 A1 | 6/2014 | Dewan et al. | |
| 2014/0298439 A1 | 10/2014 | Spiers et al. | |

* cited by examiner

TRUSTED COMPUTING RESOURCE METER

FIELD OF THE SPECIFICATION

This disclosure relates in general to the field of computer networking, and more particularly, though not exclusively to, a system and method for a trusted computing resource meter.

BACKGROUND

Shared computing resources are well known in the art. Since the 1960s, time-sharing resources have been in place, in which individuals or enterprises could pay for batch processing, such as by submitting batches on punch cards or paper tape, and waiting to later receive an output. Over time, such systems evolved in both structure and purpose. In more modern practice, managed hosting may enable a person or enterprise to purchase computing resource by, for example, the processor-hour. These are often used for tasks such as serving web traffic, and may be hosted on computers residing in a large data center. In something of a reversal of the same phenomenon, some individual users may "donate" spare processing capacity to favorite projects. For example, "SETI@home" volunteer processing capacity to analyze radio signals for evidence of extra-terrestrial intelligence.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
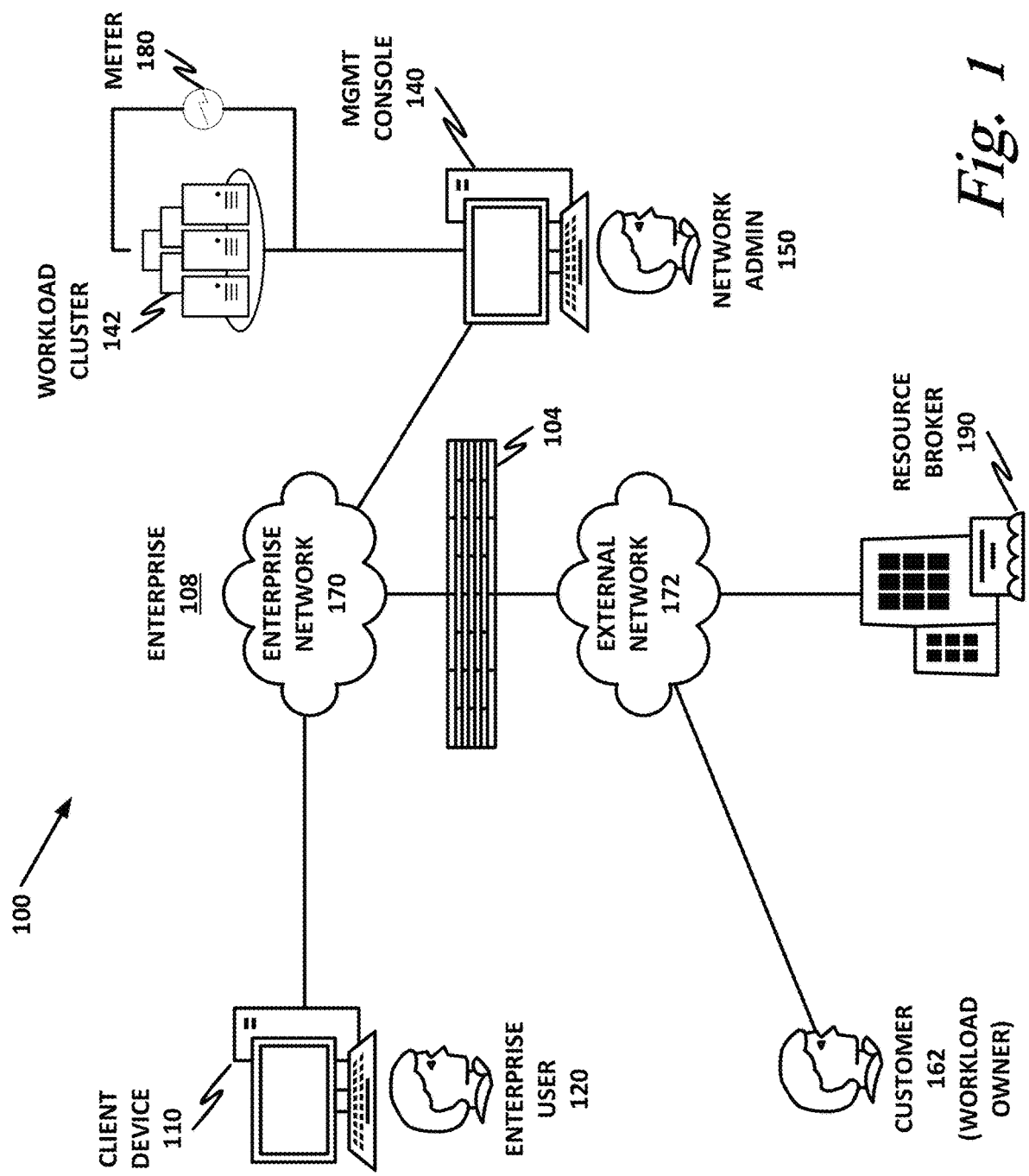
FIG. 1 is a block diagram of a shared computing network according to one or more examples of the present specification.

In an example, there is disclosed a computing apparatus, having a computing resource; a bespoke sensor for measuring at least one parameter of usage of the computing resource; and one or more logic elements providing a trusted compute meter (TCM) agent to: receive an external workload; provision a workload enclave; execute the external workload within the TCM enclave; and measure resource usage of the external workload via the bespoke sensor. There is also disclosed a computer-readable medium having stored thereon executable instructions for providing a TCM agent, and a method of providing a TCM agent.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

One challenge in effectively monetizing compute resources in ecosystems such as data centers and the internet of things (IoT) is identifying resource usage with sufficient granularity. An effective system should securely collect and process compute resources and energy consumption data for a given workload. For example, some pricing models for compute capacity of cloud service providers is based on time and coarse-grained notions of platform quality. For example, pricing may be based on tiers, such as 2 central processing unit (CPU) socket or 4 CPU socket servers, per hour.

Some existing processor platforms provide debug, performance, and energy profiling hardware sensors and software capabilities. However, these may not be secure. An attacker with system management mode (SMM) or Ring 0 privileges can alter the sensor configurations or delete or modify the sensor data on its way to Ring 3 applications.

In addition, the current hardware sensors may not be designed to measure a resource at a useful granularity. For example, an existing watt-meter for server platforms may operate at the granularity of the entire system or rack. As a result, they do not provide consumption data that can be allocated to individual workloads. So some distributed computing service providers base fee schedules on hours of compute, rather than on the actual amount of computing performed or resources consumed.

In some cases, this pricing model may not capture the true cost of computing from the perspective of the resource owner, as this formula serves only as a proxy for some expensive resources. For example, power and cooling constitute a significant computational cost, and may vary widely between a CPU serving static web pages and a CPU performing intense graphics processing. In a model where both are billed at the same rate, there is danger that the owner of the resource is not receiving adequate remuneration, or that to ensure adequate remuneration, he has to charge an average price that does not properly reflect usage for each client, and thus may not be competitive. It is therefore advantageous for the owner of the resource to charge a rate proportional to actual usage of a metered resource. Furthermore, it is advantageous to provide the resource owner with additional tracking metrics, so that clients can be charged according to more meaningful metrics.

To these ends, this specification describes a Trusted Compute Meter (TCM) capability. In one embodiment of a TCM, novel processor-based compute and energy sensors are dedicated to metering usage. These are provided by way of nonlimiting example, and in other embodiments, external sensors may be used. According to one example, any sensors used are "owned" by the TCM, meaning that they do not interact with other system resources, helping to ensure security. These sensors, wholly owned by the TCM, may be referred to as "bespoke sensors." It should be understood, however, that a bespoke sensor need not be specially designed for the TCM ab initia. Rather, it may in some cases be an off-the-shelf sensor specially designated or configured for use by the TCM in a particular context.

The TCM may also include a trusted execution environment (TEE), which may be instantiated for example in a memory enclave using special instructions such as the Intel® Software Guard Extension™ (SGX) instruction set, which provides special instructions for entering, exiting, and operating on a TEE. The combination of a TEE and bespoke sensors may help to ensure that sensor data cannot be tampered with by privileged processes. For example, it is fairly trivial for a privileged user to compromise a process or storage location owned by the operating system (OS), even if OS-level protections are provided. Thus, a resource owner could tamper with sensor readings and over-charge or under-charge a customer. However, when a TCM includes a TEE and bespoke sensors, it can operate completely independently of the operating system, and may run from a read-only memory (ROM) or BIOS chip. This makes it difficult or impossible for a user to tamper with. For increased security, a program in a ROM may be signed, such as with a checksum, and may provide signed outputs, so that a user can verify that output was produced by the original, unmodified code.

The TCM of the present specification can be used to create any suitable types of metered usage that a resource owner would like to monetize, such as communications, storage, and energy transmission. Advantageously, the resources need not be owned by the same entity. For example, one entity may own a storage, another may provide network connectivity, and another may own the physical processors and hardware. A resource broker can broker usage agreements between these various entities and between end users, so that appropriate agreements for resource usage can be put in place for all actors.

The TCM of the present specification may also be used with resources other than CPUs, such as graphics processing units (GPUs) and neural network processors (NNPs). With the addition of appropriate compute and energy consumption sensors to these engines, it is possible to collect accurate consumption data for workloads executing on those engines and feed those data into a TCM hosted on the same platform.

The scope of what constitutes a "workload to be measured" can vary between processing engine types. The embodiment described above uses a TEE to bound the scope of its measurements. Other possible scopes include Virtual Machines (VMs) and GPU execution units. The different scopes may have different security features, and a single TCM may be configured to operate within different scopes on the same machine. For example, a single machine may provide a TCM within a VM, and a TCM within TEE. The machine may be configured to provision different workloads within either scope.

This model benefits all parties to a transaction. The resource owner is paid a fee representative of his actual operating costs for each workload, and the workload owner pays a fee representative of the actual cost of his workload, while also receiving a trusted, verifiable accounting of that actual usage.

Advantageously, the TCM of the present specification provides a framework for enabling support and deployment of a secure distributed computing service for data centers and internet of things (IoT) ecosystems. As described above, many users may volunteer spare computing resources for pet projects such as SETI@home, but the TCM described herein provides a framework wherein they can actually sell spare processor cycles, memory, or storage space. Thus for example, a desktop user who mostly does e-mail and word processing, but occasionally needs to perform intensive graphic rendering may have two options open. One, she may "rent" extra processing power on-demand when she needs the extra capacity. Or two, she may purchase a more capable workstation, and monetize its spare capacity when she is using only a small part of its capacity. In the first case, she can be confident that she is paying only for the resources she actually uses. In the second she can be confident that subletting her spare capacity will not interfere with her own work, because the use of a TEE effectively segregates the foreign workload. Furthermore, if the user needs to access more of her own compute resources, it need not matter that the foreign workload has not finished processing. It can save its state, offload to another available machine in the network, and finish processing there. Each resource owner is paid for the capacity actually used on his or her machine.

A trusted compute meter will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a distributed network 100 according to one or more examples of the present specification. In the example of FIG. 1, distributed network 100 may be configured to provide distributed computing services to different users and entities. In this example, an enterprise 108 may contract with a resource broker 190 to allow enterprise users 120, as well as external customers 162, to access on-demand compute resources from workload cluster 142.

Figure 3:
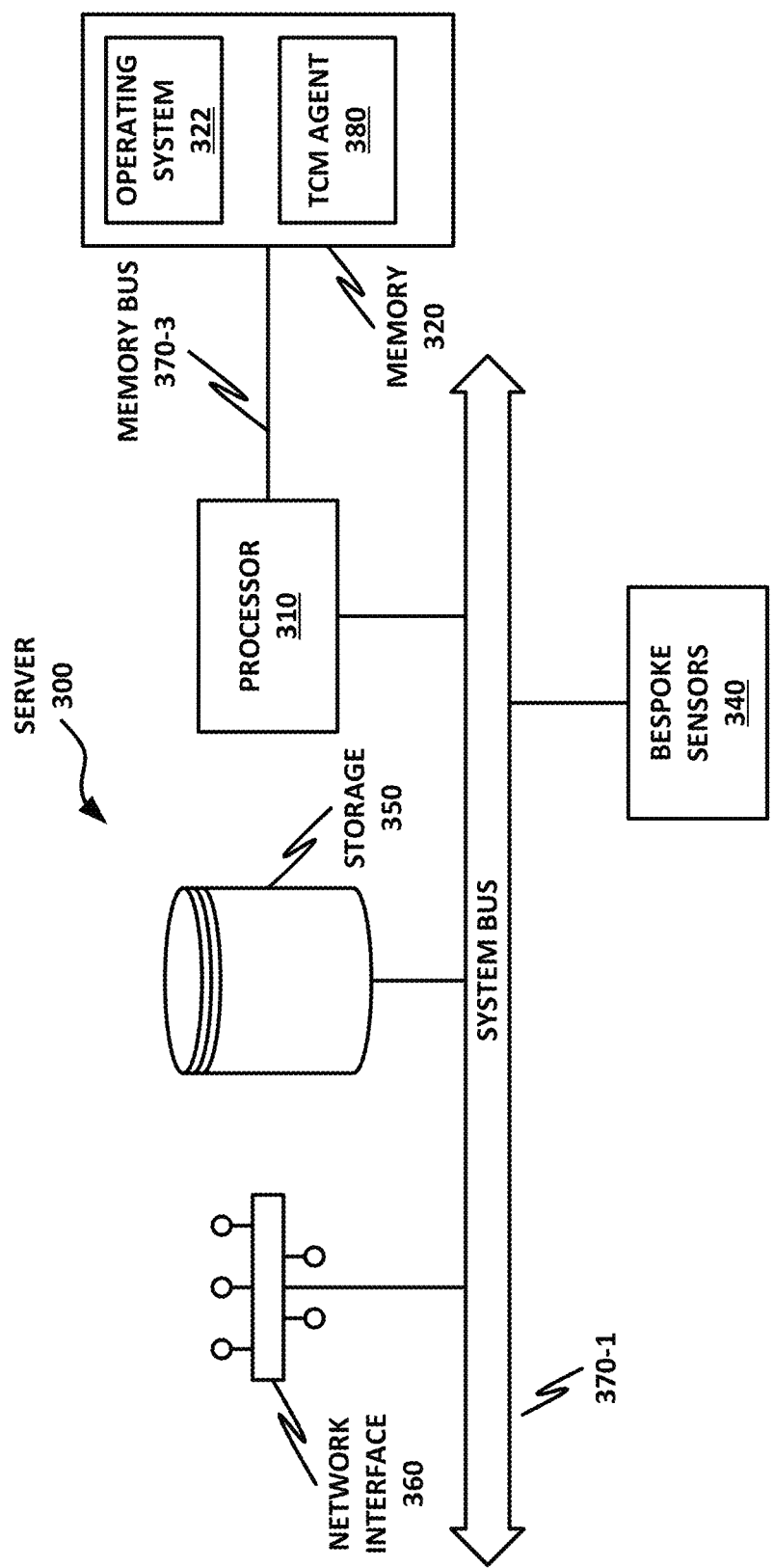
FIG. 3 is a block diagram of a shared computing host according to one or more examples of the present specification.

Workload cluster 142 may represent compute resources owned by enterprise 108, as in this illustration, such as a large monolithic data center with a large number of homogeneous rack-mounted computers running a large number of virtual machines and providing different services, with each server or processing core configured to function as a service node. However, this need not be the case. Workload cluster 142 could also be a large data center owned by a third party resource owner. In a massively distributed or IoT context, workload cluster 142 could represent a heterogeneous cloud of many devices, running different operating systems and having different levels of available compute resources, each available to function as a service node. This cloud may be a constantly shifting and evolving entity, with different resources coming online and going offline, with full or partial availability, and different levels of resources constantly becoming either available or unavailable. Thus, yet another third-party resource broker 190 may engage to manage these resources in a meaningful way, and to broker availability with demand, to ensure that workloads are distributed in a fair manner between available service nodes, that consumers (enterprise users 120 and customer 162) are paying fairly for resources consumed, and that providers are being paid fairly for resources provided. To that end, one or more meters 180 are provided to measure parameters of interest. Meter 180 may be or comprise one or more bespoke sensors (FIG. 3).

Enterprise users 120 may access resources via enterprise network 170, which sits behind a firewall 104. Customers 162 may access information or services via external network 172. This may require distributed network 100 to at least partly expose certain services and networks to the outside world, thus creating a logical security aperture.

Within distributed network 100, one or more enterprise users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the Internet. Enterprise network 170 may also provide access to an external network, such as the Internet, via external network 172. External network 172 may similarly be any suitable type of network.

If owned by enterprise 108, workload cluster 142 may be, for example, a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should also be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Network administrator 150 may also configured service nodes in workload cluster 142 to appropriately provide distributed network functionality. This may include installing software, or verifying that software has been appropriately installed. Note that network administrator 150 may be an agent of enterprise 108, or of resource broker 190, as circumstances dictate.

Distributed network 100 may communicate across enterprise boundary 104 with external network 172. Enterprise boundary 104 may represent a physical, logical, or other boundary. External network 172 may include, for example, websites, servers, network protocols, and other network-based services.

Distributed network 100 may also contract with or subscribe to a resource broker 190, which may provide secure resource broker services. Resource broker 190 may also help to secure enterprise network 172, such as by providing security services, updates, antivirus definitions, patches, products, and services. McAfee®, Inc. is a non-limiting example of such a security services provider that offers comprehensive security and antivirus solutions.

In another example, distributed network 100 may include a family or personal network, with parents or an end user assuming the role of network administrator 150. These users may wish to monetize spare computing resources on their devices.

Figure 2:
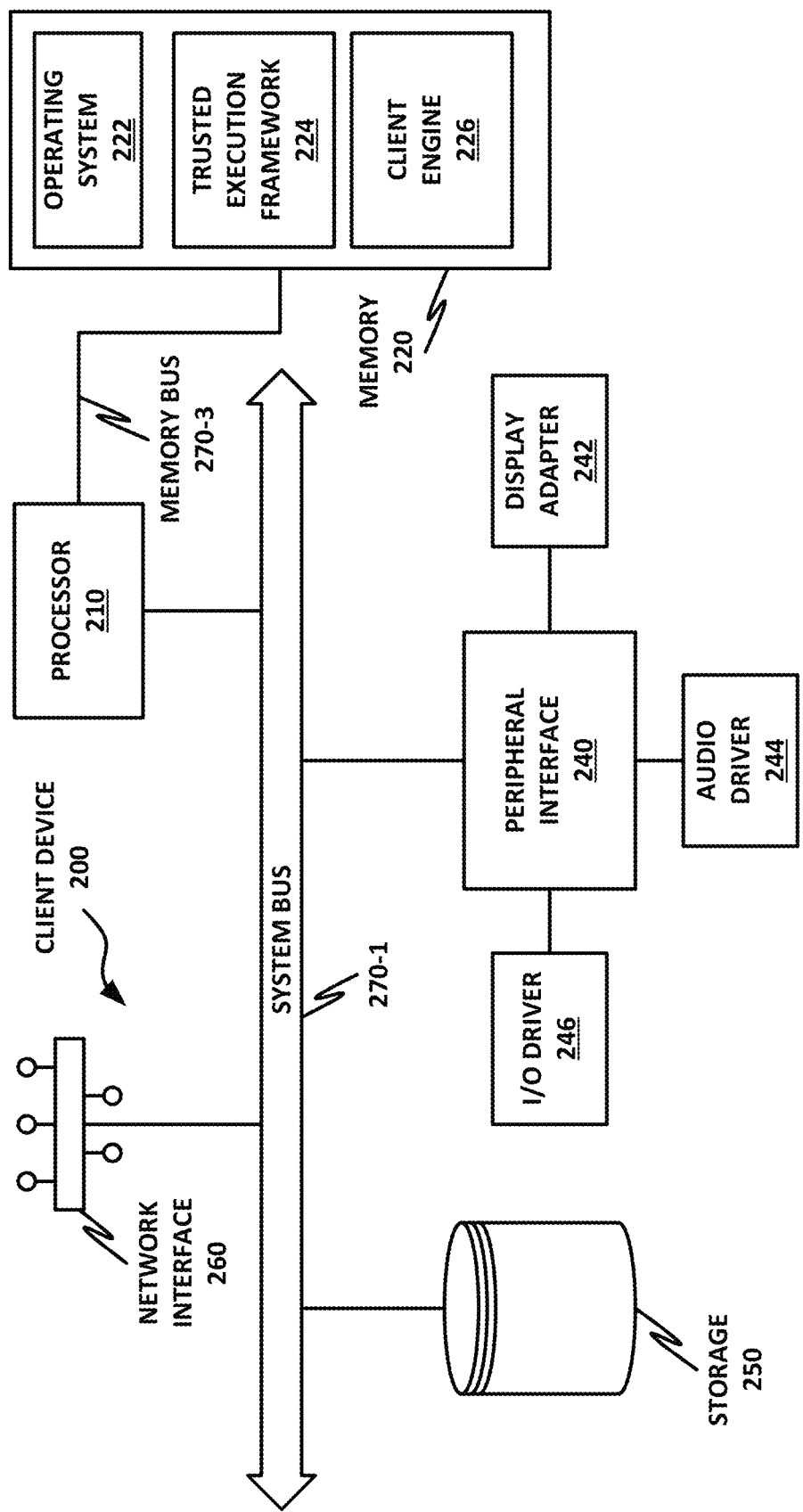
FIG. 2 is a block diagram of a shared computing client device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, client device 110 may be an embodiment of client device 200. Thus, client device 200 may be understood to be configured to access computing resources on a remote host, such as a service node in workload cluster 142.

Client device 200 includes a processor 210 connected to a memory 220, having stored therein executable instructions for providing an operating system 222 and at least software portions of a trusted execution framework 224. Other components of client device 200 include a storage interface 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of trusted execution framework 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Trusted execution framework (TEF) 224, in one example, is operable to carry out computer-implemented methods as described in this specification. TEF 224 may include one or more tangible non-transitory computer-readable mediums having stored thereon executable instructions operable to instruct a processor to provide a trusted execution framework 224. As used throughout this specification, an "engine" includes any combination of one or more logic elements, of similar or dissimilar species, operable for and configured to perform one or more methods provided by the engine. Thus, TEF 224 may comprise one or more logic elements configured to provide methods as disclosed in this specification. In some cases, TEF 224 may include a special integrated circuit designed to carry out a method or a part thereof, and may also include software instructions operable to instruct a processor to perform the method. In some cases, TEF 224 may run as a "daemon" process. A "daemon" may include any program or series of executable instructions, whether implemented in hardware, software, firmware, or any combination thereof that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space" associated with ring 0, 1, or 2 in a protection ring architecture. It should also be noted that TEF 224 may also include other hardware and software, including configuration files, registry entries, and interactive or user-mode software by way of non-limiting example.

In one example, TEF 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of TEF 224 to provide the desired method.

Figure 4:
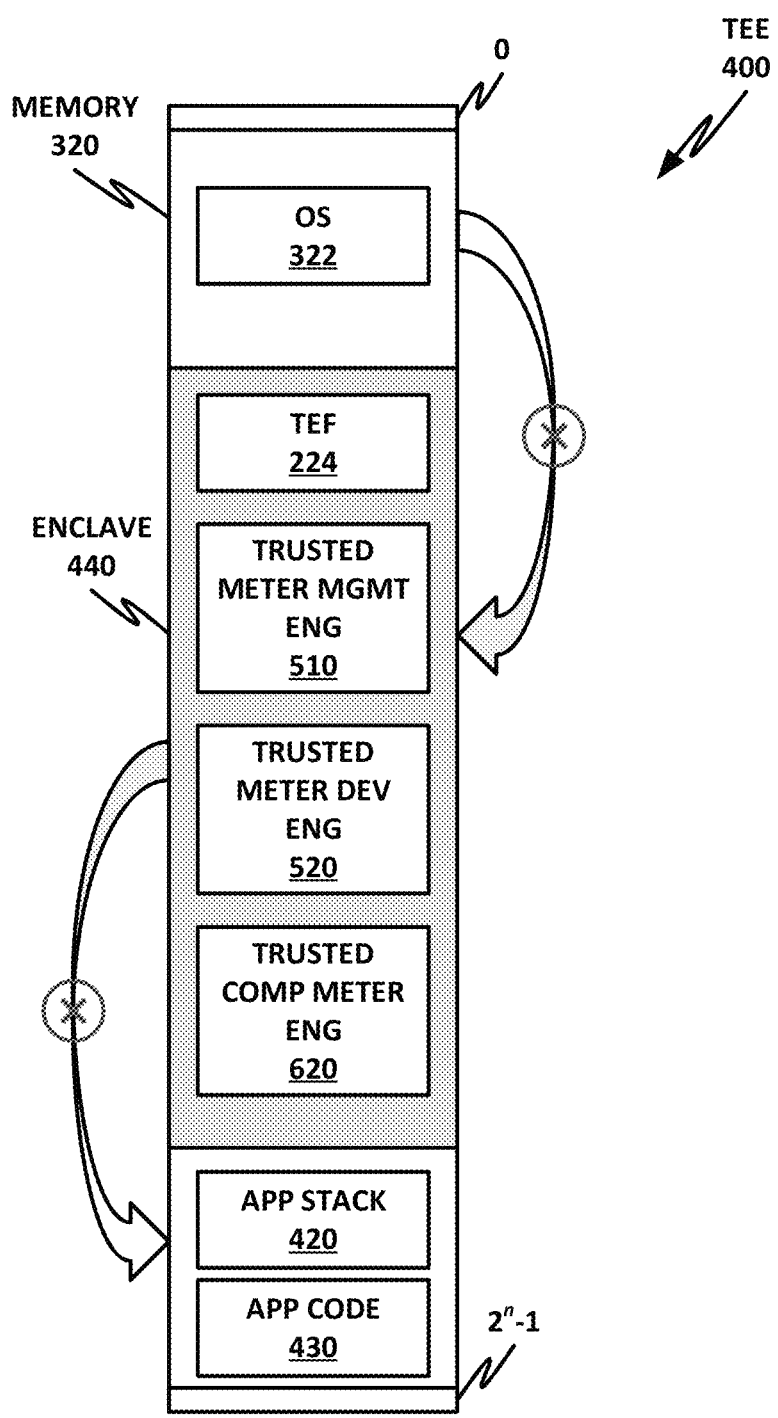
FIG. 4 is a block diagram of a trusted execution environment according to one or more examples of the present specification.

Conceptually, TEF 224 may provide an application programming interface (API), and supporting software, that simplifies a programmer's use of TEE 400 (FIG. 4).

TEF 224 may be provided in cases where client device 200 includes a TEE 400. This may permit client device 200 to engage in secure communication with server 300 (FIG. 3), thus being able to provide secured (encrypted/signed) workloads, and being able to receive back secure (encrypted/signed) workload results. This provides end-to-end security for offloaded workloads.

Client engine 226 may include one or more non-transitory computer-readable mediums having stored thereon executable instructions operable to instruct a processor to provide client engine 226. At an appropriate time, such as upon booting client device 200 or upon a command from operating system 222 or a user 120 or security administrator 150, processor 210 may retrieve a copy of client engine 226 (or software portions thereof) from storage 250 and load it into memory 220. Processor 210 may then iteratively execute the instructions of client engine 226 to provide the desired method.

Client engine 226 may provide for client device 200 the ability to offload workloads to workload cluster 142. Client engine 226 is an "engine" as described above, and provides the logic necessary to package a workload for export to workload cluster 142, and to receive results back for import from workload cluster 142. Client engine 226 may also include billing logic, which can be used to verify that the user is getting the compute resources he or she is paying for.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

FIG. 3 is a block diagram of a server device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides workloads to be processed, while server 300 provides available compute resources to process those workloads. Thus, it should be understood that server 300 need not be a server in the traditional "big iron" sense, but rather is a device with available compute resources that is configured to provide a TCM.

Server 300 includes a processor 310 connected to a memory 320, having stored therein executable instructions for providing an operating system 322 and at least software portions of a server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 300 to a wired or wireless network, and may include one or more logic elements as described in FIG. 2.

There is also defined in memory 320 TCM AGENT 380, which is described in more detail in connection with FIG. 4. TCM AGENT 380 may be provided in or may be part of a TEE, which provides the logic to allow server 300 to import and process workloads from client devices 200 in a secure manner, according to the methods described herein. Note that TCM AGENT 380 may be provided outside of OS 322 so that OS 322 and processes owned by OS 322 cannot tamper with TCM AGENT 380. Thus, TCM AGENT 380 may be understood to operate "out of band" of the normal OS processes. In some embodiment, TCM AGENT 380 comprises special instructions in processor 310, as well as logic that may be encoded in a non-transitory computer-readable medium such as a ROM, so that it is very difficult to tamper with TCM AGENT 380.

Bespoke sensors 340 may also be provided to support the TCM functionality of server 300. As described above, bespoke sensors may be custom sensors provided and designed specifically for use with a TCM AGENT 380, or they may be external sensors "owned" exclusively by TCM AGENT 380 of server 300. A feature according to some embodiments of the disclosure is that bespoke sensors are not available to processes outside of TCM AGENT 380.

FIG. 4 is a block diagram of a trusted execution environment (TEE) 400 according to one or more examples of the present specification.

In the example of FIG. 4, memory 320 is addressable by n-bits, ranging in address from 0 to $2^n-1$. Within memory 320 is an OS 322, enclave 440, application stack 420, and application code 430.

In this example, enclave 440 is a specially-designated portion of memory 320 that cannot be entered into or exited from except via special instructions, such as Intel® SGX or similar. Enclave 440 is provided as an example of a secure environment which, in conjunction with TEF 224, forms a trusted execution environment (TEE) 400 on server 300 or on client device 200. A TEE 400 is a combination of hardware, software, and/or memory allocation that provides the ability to securely execute instructions without interference from outside processes, in a verifiable way. By way of example, TEE 400 may include memory enclave 440 or some other protected memory area, and a TEF 224, which includes hardware, software, and instructions for accessing and operating on enclave 440. Non-limiting examples of solutions that either are or that can provide a TEE include Intel® SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, TEF 224 may be a user-mode application that operates via trusted execution framework 224 within enclave 440. TEE 400 may also conceptually include processor instructions that TEF 224 require to operate within enclave 440. TEE 400 may also specifically include special instructions that processor 310 may use to access and store data from bespoke sensors 340.

Enclave 440 and trusted execution framework 224 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 322 may be excluded from TCB, in addition to the regular application stack 420 and application code 430.

In certain systems, computing devices equipped with the Intel Software Guard Extension (SGX) or equivalent instructions may be capable of providing an enclave 440. It should be noted however, that many other examples of TEEs are available, and TEE 400 is provided only as one example thereof. Other secure environments may include, by way of nonlimiting example, a virtual machine, sandbox, testbed, test machine, or other similar device or method for providing a TEE 400.

In an example, enclave 440 provides a protected memory area that cannot be accessed or manipulated by ordinary computer instructions. Enclave 440 is described with particular reference to an Intel® SGX enclave by way of example, but it is intended that enclave 440 encompass any secure processing area with suitable properties, regardless of whether it is called an "enclave."

One feature of an enclave is that once an enclave region 440 of memory 220 is defined, as illustrated, a program pointer cannot enter or exit enclave 440 without the use of special enclave instructions or directives, such as those provided by Intel® SGX architecture. For example, SGX processors provide the ENCLU[EENTER], ENCLU[ERESUME], and ENCLU[EEXIT]. These are the only instructions that may legitimately enter into or exit from enclave 440.

Thus, once enclave 440 is defined in memory 220, a program executing within enclave 440 may be safely verified to not operate outside of its bounds. This security feature means that any securely processed instructions are verifiably local to enclave 440. Thus, when an imported packet provides its content to be rendered with trusted execution framework 224 of enclave 440, the result of the rendering is verified as secure.

Enclave 440 may also digitally sign its output, which provides a verifiable means of ensuring that content has not been tampered with or modified since being rendered. A digital signature provided by enclave 440 is unique to enclave 440 and is unique to the hardware of the device hosting enclave 440.

Several engines are disclosed that separately or together may provide TCM AGENT 380. These may include trusted meter management engine 510, trusted meter device engine (both shown with greater particularity in FIG. 5), and trusted compute meter engine 620 (shown with greater particularity in FIG. 6). Each of these may be an engine as described in FIG. 2 and, in one example, include one or more logic elements operable to carry out computer-implemented methods as described in this specification. Software portions of these engines may run as a daemon process.

Each of these engines may include one or more non-transitory computer-readable mediums having stored thereon executable instructions operable to instruct a processor to provide the engine. At an appropriate time, such as upon booting server 300 or upon a command from operating system 322 or a user 120 or security administrator 150, processor 310 may retrieve a copy of the engine (or software portions thereof) from storage 350 and load it into memory 320. Processor 310 may then iteratively execute the instructions of the engine to provide the desired method.

Figure 5:
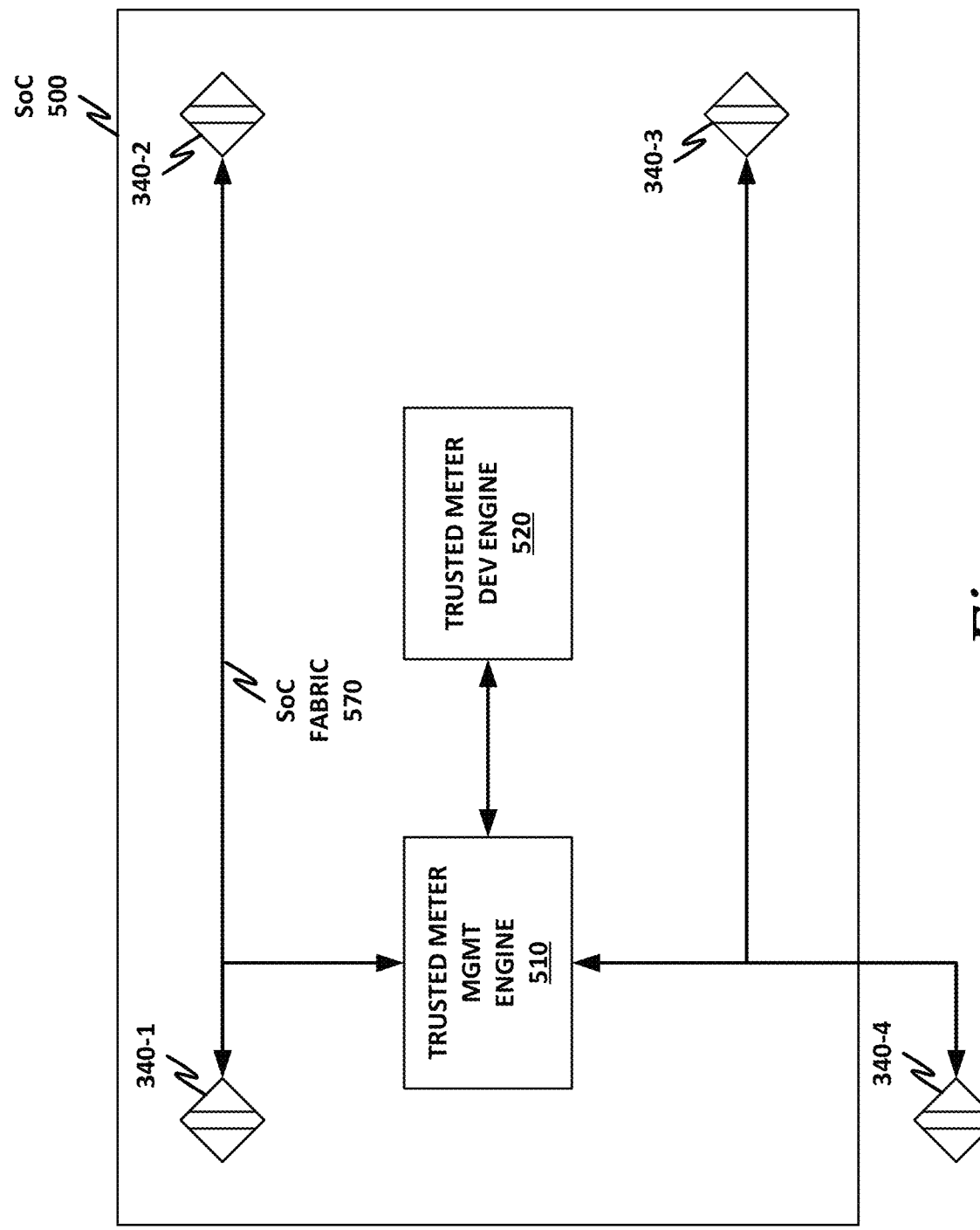
FIG. 5 is a block diagram of a system on a chip employing a trusted compute meter according to one or more examples of the present specification.

FIG. 5 is a block diagram of a system-on-a-chip (SoC) providing a TCM AGENT 380 according to one or more examples of the present specification. In the example of FIG. 5, SoC 500 includes a plurality of bespoke sensors 340. Bespoke sensors 340-1, 340-2, and 340-3 are provided on-chip, and are intended specifically for use with TCM AGENT 380. Bespoke sensor 340-4 is shown off-chip, and may be an off-the-shelf sensor configured to operate as a bespoke sensor 340, and may be "owned" exclusively by TCM AGENT 380.

Each bespoke sensor 340 may be configured to measure a particular parameter that is of interest to TCM AGENT 380. For example, bespoke sensor 340-1 may be a wattmeter to measure power consumption over time. Bespoke sensor 340-2 may be a thermometer to measure heat generated by a processor over time. Bespoke sensor 340-3 may be a network analyzer to measure a volume of network traffic.

Bespoke sensor 340-4 may be configured to monitor memory consumption. These are provided by way of non-limiting example, and in a general sense, any compute resource that may be useful to track may be monitored by a bespoke sensor 340. Examples of other sensors include clocks, voltmeters, amp meters, data flow meters, logic analyzers, storage meters, or any other suitable meter that measures consumption of a compute resource.

Bespoke sensors 340 may be managed at a hardware level by trusted meter management engine (TMME) 510. This may ensure that only TCM AGENT 380 has access to bespoke sensors 340, and may also provide bespoke sensors 340 greater logic capabilities than may be available to simple analog sensors with a counter. TMME 510 may be provided with a separate processor and memory in certain embodiments, including a processor with TEE capabilities. In some embodiments, an external sensor such as bespoke sensor 340-4 may be a "smart sensor," with its own processor and memory. In that case, TMME 510 may be provided in a separate TEE on bespoke sensor 340-4, and that TEE may securely communicate with TEE 400 of server 300.

SoC fabric 570 may be a network or bus as described herein, and may include access control mechanisms that isolate bespoke sensors 340 from all hardware and software blocks except TMME 510 (e.g., SMM code, apps, OS, VM Apps, VM OS, and VMM are outside of the TCB).

Trusted meter device engine (TMDE) 520 may be or be provided in a separate enclave. TMDE 520 may be operable to configure, calibrate, or otherwise manage bespoke sensors 340 as necessary. Secure communication may be used between TMDE 520 and TMME 510, for example via a trusted ID mechanism such as "Sigma" protocol anonymous key exchange.

Figure 6:
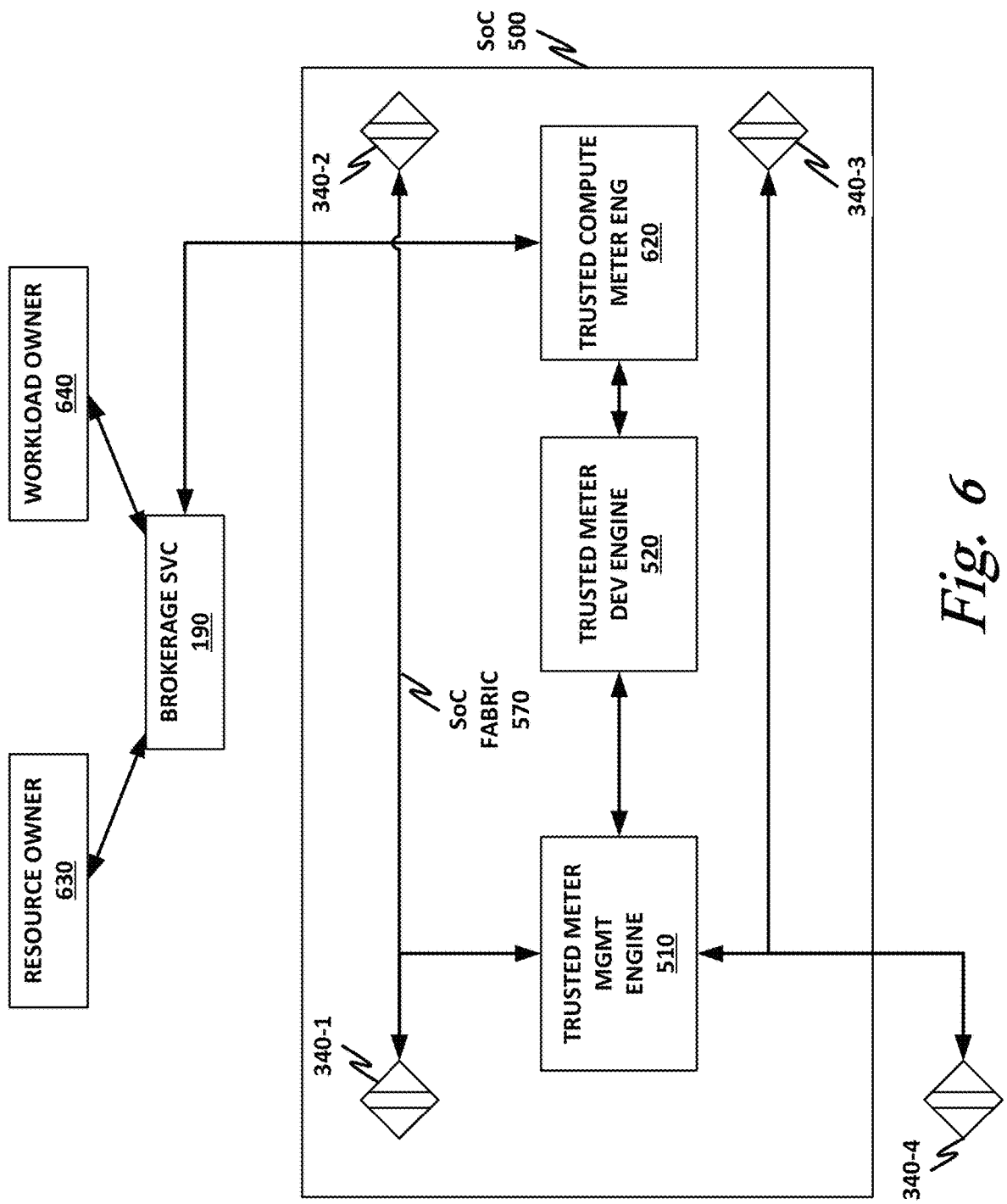
FIG. 6 is a block diagram brokered trusted metering system according to one or more examples of the present specification.

FIG. 6 is a block diagram of a TCM ecosystem according to one or more examples of the present specification. In this example, a TCM engine 620 is also disclosed, which is an engine that provides TCM logic to TCM AGENT 380. TCM engine 620 collects, processes, and forwards compute resource usage data for a workload that it has provisioned for execution on SoC 500.

In this example, a resource owner 630 and workload owner 640 contract with a resource broker 190 to mediate an exchange of resources and take advantage of distributed computing capabilities. In this exchange, workload owner 630 is interested in being compensated for resources he makes available, and workload owner 640 is interested in accessing those resources, and is willing to provide the compensation. Note that while fiscal compensation has been used herein as a nonlimiting example, it need not be the exclusive focus of a TCM as described herein. In some cases, "compensation" may take the form of recognition, reputation, or even just granular asset tracking by an enterprise, to name just a few examples. Thus, in a broader sense, it can be said that resource owner 630 and workload owner 640 are both interested in tracking resource utilization for any suitable purpose.

Resource owner 630 and workload owner 640 may both register with brokerage service 190. Registration may include, on the part of workload owner 640, setting up an account, including means for providing compensation. This may also include providing information about workload demands, timing requirements, service level agreements (SLAs), and any other information needed to provide and execute workloads. Workload owner 640 may also need to install a client engine 226 on client device 100 so that workloads can be uploaded and results downloaded.

Resource owner 630 may also register, including for example providing a capability profile for the available resources, any restrictions on when or how long the resource may be made available, limitations on how much of the resource may be consumed either instantaneously or per-unit time (e.g., no more than 50% processor load at any one time, or no more than 1 kW-h consumed per day), and information for receiving compensation. Resource owner 630 may need to install necessary components of TCM AGENT 380, such as separately attaching SoC 500 to a resource to monitor consumption, or installing a TCM engine 620, as necessary.

Once resource owner 630 and workload owner 640 have both registered with brokerage service 190, brokerage service 190 may provision a TCM workload to the resource owned by resource owner 630. Once active TCM engine 620 registers with TMDE 520, specifying specific sensors and configurations to apply to the present workload. For security purposes, a separate TCM engine 620 may be provisioned in a separate enclave for each separate workload. This ensures that there is no cross-contamination between workloads, or security breaches between workloads. It should also be noted that TCM engine 620 may provision the enclave so that operating system 322 and programs running under operating system 322 cannot access, read from, or write to the enclave, and that the enclave cannot write out to or read from operating system 322. This ensures that operating system 322 and TCM engine 620 are secure from one another, so that they cannot interfere with one another's operation, and so that there are no security concerns between them.

In certain embodiments, resource owner 630 may register with more than one brokerage service 190. This may result in multiple provisioned TCM engines 620 and multiple provisioned TMDEs 520, with a one-to-one configuration between TCM engine 620 and TMDE 520.

Figure 7:
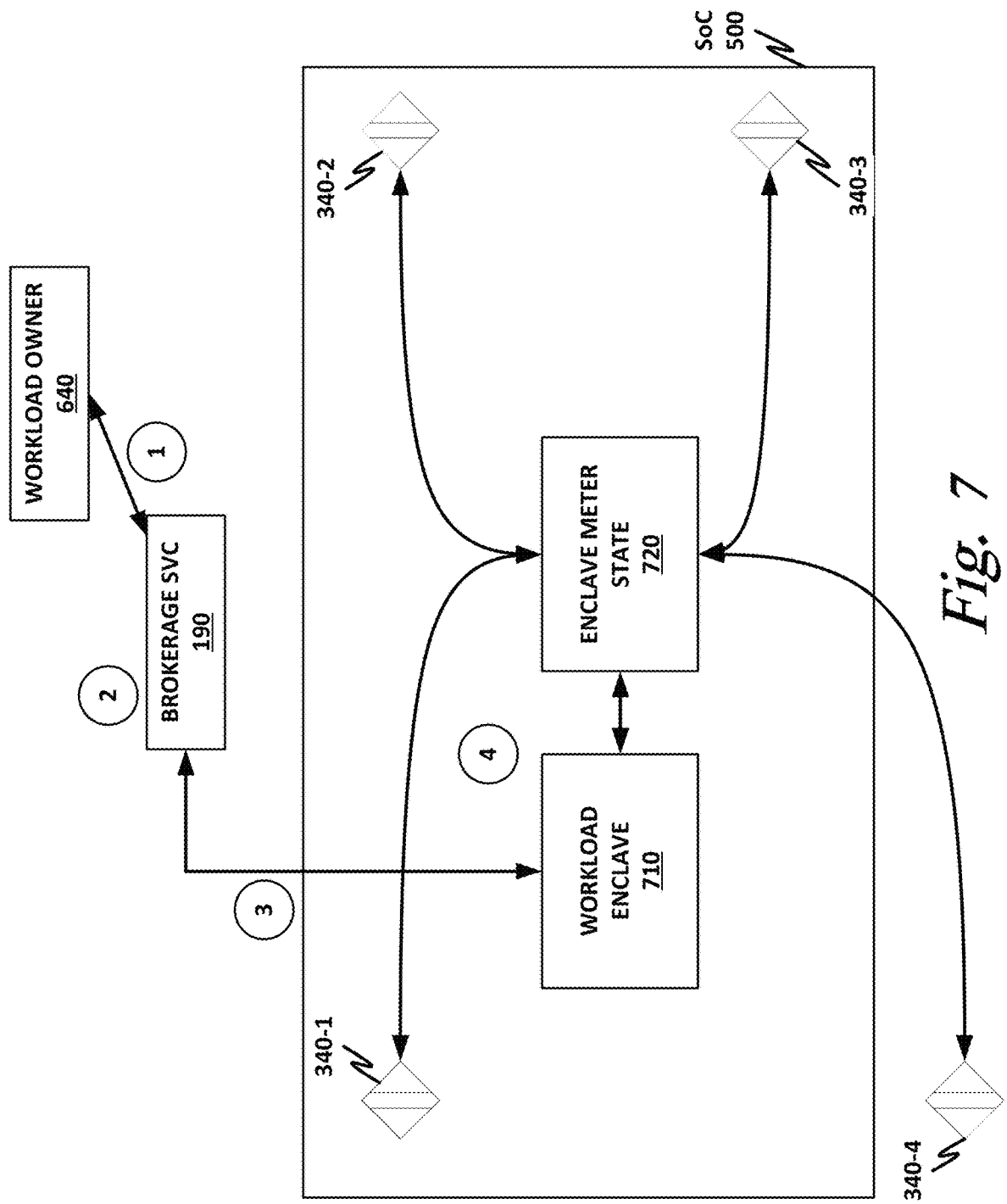
FIG. 7 is a block diagram brokered trusted metering system according to one or more examples of the present specification.

FIG. 7 is a block diagram of a workload work flow according to one or more examples of the present specification.

In this example, at operation 1, workload owner 640 submits a workload for execution to brokerage service 190. This may be referred to as a compute workload request.

At operation 2, brokerage service 190 evaluates the workload and locates an acceptable resource or resources to carry out the workload. This may include identifying, for example, a processor with memory, a storage, an internet service provider for network operations, or any combination. In some cases, more than one resource of the same type may be identified. For example, in some massively parallel workloads, the workload can be divided between many different processors. Thus, brokerage service 190 may divide the workload into chunks, and assign one or more chunks each to several different processors. In some cases, explicit programming calls or pragmas may be used to demarcate portions of a program that can be easily divided in this manner. This allows workload owner 640 to exercise control over how finely the workload can be divided and parceled.

In operation 3, brokerage service 190 provisions part or all of the workload SoC 500. Policies cryptographically bound to the workload by brokerage service 190 tell target SoC 500 that the workload will be metered, and which TCM engine 620 to "seal" the meter sensor data to. Sealing keys may be derived and configured when the TCM enclave 620 registers with TMDE 520. Note that measuring the workload may occur transparently to TCM engine 620, along with posting an event to schedule TCM engine 620 to process the data.

In operation 4, before workload execution, one or more appropriate bespoke sensors 340 are selected and configured. As execution proceeds, meter sensor data may be collected and stored in enclave meter state 720. Based on specific configurable events, such as a context switch, a snapshot of the current sensor data from bespoke sensors 340 is sealed to workload enclave 710, along with posting an event to schedule workload enclave 710 to process the data. In other words, this may provide a store-and-forward system in which TCM engine 620 does not have to be executing at the same time as workload enclave 710.

Figure 8:
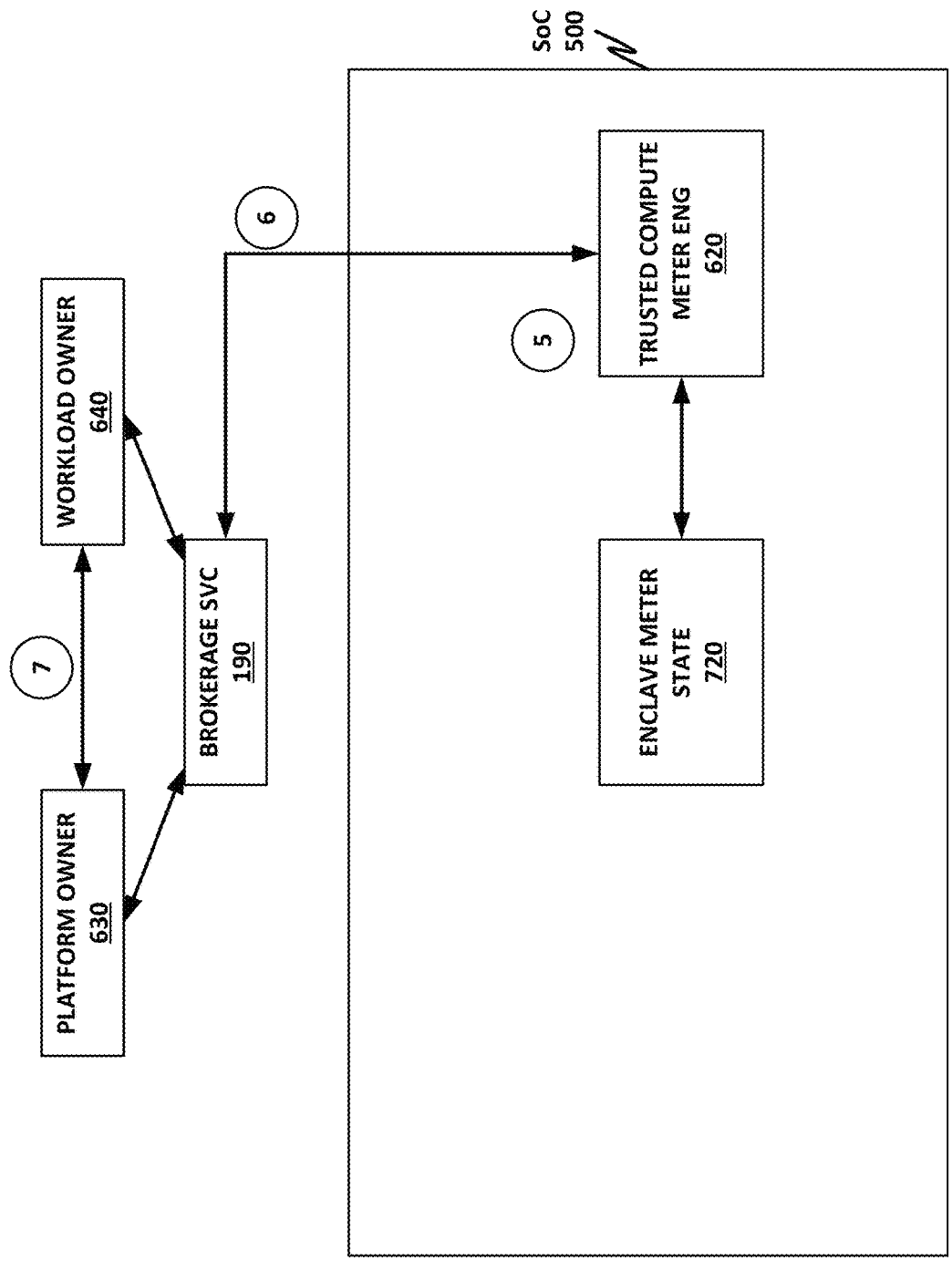
FIG. 8 is a block diagram brokered trusted metering system according to one or more examples of the present specification.

FIG. 8 is a block diagram of additional operations in a trusted compute exchange according to one or more examples of the present specification.

In operation 5, when TCM engine 620 executes in an enclave, software may convert or "up-level" raw data saved in enclave meter state 720. These data may be converted into units appropriate for the actual billing, as agreed during the registration process. In some embodiments, up-leveling is performed not only for convenience, but because raw sensor data may represent a significant covert or side-channel threat vector.

In operation 6, the converted data are uploaded to brokerage service 190, which may use the data to create an electronic invoice. The invoice may be provided to both platform owner 630 and workload owner 640 for auditing purposes.

In operation 7, workload owner 640 and platform owner 630 exchange consideration as agreed. This may be a direct transaction, or may also be brokered by brokerage service 190. In one example, brokerage service 190 aggregates smaller payments on a daily, weekly, monthly, or other appropriate time basis, or until a certain threshold value of remuneration is reached, and then pays platform owner 630. This may be especially useful in massively distributed or IoT contexts, in which platform owner 630 may accrue only micropayments for each individual transaction.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware, including hardware instructions or microcode, configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in an example a computing apparatus, comprising: a computing resource; a bespoke sensor to measure at least one parameter of usage of the computing resource; and one or more logic elements comprising a trusted compute meter (TCM) agent to: receive an external workload; provision a workload enclave; execute the external workload within the workload enclave; and measure resource usage of the external workload via the bespoke sensor.

There is further disclosed an example, wherein the bespoke sensor is to provide fine-grained compute or energy consumption data for the external workload.

There is further disclosed an example, wherein the TCM agent is to be provided within a trusted execution environment (TEE) to isolate the TCM agent from untrusted portions of the computing device.

There is further disclosed an example, further comprising a secure interface to configured the bespoke sensor.

There is further disclosed an example, wherein the TCM agent is to provision the workload enclave within a scope selected from at least two different scopes, wherein each scope has different security features from the other scope.

There is further disclosed an example, wherein the one or more logic elements comprise a processing device selected from the group consisting of a central processing unit, graphical processing unit, and a neural network processor.

There is further disclosed an example, wherein the TCM agent is to provision a first workload enclave for a first workload, and a second workload enclave for a second workload, wherein the first workload enclave and second workload enclave are logically separate and mutually exclusive.

There is further disclosed an example, wherein the bespoke sensor is to measure the workload independently of the workload and of an operating system running on the computing apparatus.

There is further disclosed an example, wherein the TCM agent is further to save data of the bespoke sensor as part of a workload state.

There is further disclosed an example, wherein the TCM agent is further to snapshot and seal data from the bespoke sensor to the workload enclave based on a configurable event.

There is further disclosed an example, wherein the TCM agent is to execute within a TCM enclave separate from and mutually exclusive of the workload enclave.

There is further disclosed an example, wherein the TCM agent is further to convert raw data from the bespoke sensor into a billing-appropriate unit in a format different from the raw data.

There is further disclosed an example, wherein the at least one parameter is selected from the group consisting of power consumption, processor cycles consumed, memory consumed, storage consumed, energy transmission, and volume of communication.

There is also disclosed in an example, one or more tangible, non-transitory computer-readable mediums having stored thereon executable instructions to instruct a processor to provide a trusted compute meter to: receive an external workload for execution on a computing resource; provision a workload enclave to execute the external workload; execute the external workload within the workload enclave using the computing resource; and measure resource usage of the external workload via a bespoke sensor configured to measure at least one parameter of usage of the computing resource.

There is further disclosed an example, wherein the bespoke sensor is to provide fine-grained compute or energy consumption data for the external workload.

There is further disclosed an example, wherein the TCM agent is to be provided within a trusted execution environment (TEE) to isolate the TCM agent from untrusted portions of the computing device.

There is further disclosed an example, wherein the TCM agent is to provision the workload enclave within a scope selected from at least two different scopes, wherein each scope has different security features from the other scope.

There is further disclosed an example, wherein the TCM agent is to provision a first workload enclave for a first workload, and a second workload enclave for a second workload, wherein the first workload enclave and second workload enclave are logically separate and mutually exclusive.

There is further disclosed an example, wherein the bespoke sensor is to measure the workload independently of the workload and of an operating system running on the computing apparatus.

There is further disclosed an example, wherein the TCM agent is further to save data of the bespoke sensor as part of a workload state.

There is further disclosed an example, wherein the TCM agent is further to snapshot and seal data from the bespoke sensor to the workload enclave based on a configurable event.

There is further disclosed an example, wherein the TCM agent is further to convert raw data from the bespoke sensor into a billing-appropriate unit in a format different from the raw data.

There is further disclosed an example, wherein the at least one parameter is selected from the group consisting of power consumption, processor cycles consumed, memory consumed, storage consumed, energy transmission, and volume of communication.

There is further disclosed an example of a method of providing a trusted compute meter agent comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus, comprising:
a hardware platform comprising a computing resource;
a bespoke sensor to measure at least one parameter of usage of the computing resource;
a first trusted execution environment (TEE) comprising a processor configured to provide instructions to provide trusted access to a memory enclave; and
a trusted compute meter (TCM) agent comprising logic to operate within the first TEE independently of an operating system of the apparatus, the bespoke sensor, and a secure communication channel to communicatively couple the TCM agent logic to the bespoke sensor, wherein the TCM is to:
receive an external workload;
provision a workload enclave within the first TEE;
execute the external workload within the workload enclave; and
measure resource usage of the external workload via the bespoke sensor, wherein the bespoke sensor is wholly owned by the TCM agent and is restricted from interacting with other system resources,
wherein the bespoke sensor is managed at a hardware level by a trusted meter management engine (TMME) in a second TEE, and wherein the TMME provides secure communication between the TCM agent of the first TEE and the TMME.

2. The computing apparatus of claim 1, wherein the bespoke sensor is to provide fine-grained compute or energy consumption data for the external workload.

3. The computing apparatus of claim 1, further comprising a secure interface to configure the bespoke sensor.

4. The computing apparatus of claim 1, wherein the TCM agent is to provision the workload enclave within a scope selected from at least two different scopes, wherein each scope has different security features from the other scope.

5. The computing apparatus of claim 1, wherein TCM agent logic further comprises a processing device selected from a group consisting of a central processing unit, graphical processing unit, and a neural network processor.

6. The computing apparatus of claim 1, wherein the TCM agent is to provision a first workload enclave for a first workload, and a second workload enclave for a second workload, wherein the first workload enclave and second workload enclave are logically separate and mutually exclusive.

7. The computing apparatus of claim 1, wherein the bespoke sensor is to measure the external workload independently of the workload enclave and of an operating system running on the computing apparatus.

8. The computing apparatus of claim 1, wherein the TCM agent is further to save data of the bespoke sensor as part of a workload state.

9. The computing apparatus of claim 1, wherein the TCM agent is further to snapshot and seal data from the bespoke sensor to the workload enclave based on a configurable event.

10. The computing apparatus of claim 1, wherein the TCM agent is to execute within a TCM enclave separate from and mutually exclusive of the workload enclave.

11. The computing apparatus of claim 1, wherein the TCM agent is further to convert raw data from the bespoke sensor into a billing-appropriate unit in a format different from the raw data.

12. The computing apparatus of claim 1, wherein the at least one parameter is selected from the group consisting of power consumption, processor cycles consumed, memory consumed, storage consumed, energy transmission, and volume of communication.

13. One or more tangible, non-transitory computer-readable mediums having stored thereon executable instructions to instruct a processor to provide a trusted compute meter (TCM) agent to operate independently of a host operating system and to communicate securely with a bespoke sensor, wherein the TCM agent is to be provided within a first trusted execution environment (TEE) comprising a processor configured to provide instructions to provide trusted access to a memory enclave, to:

receive an external workload for execution on a hardware platform comprising a computing resource;

provision a workload enclave to execute the external workload;

execute the external workload within the workload enclave using the computing resource; and measure resource usage of the external workload via a bespoke sensor configured to measure at least one parameter of usage of the computing resource, wherein the bespoke sensor is wholly owned by the TCM agent and is restricted from interacting with other system resources, wherein the bespoke sensor is managed at a hardware level by a trusted meter management engine (TMME) in a second TEE, and wherein the TMME provides secure communication between the TCM agent of the first TEE and the TMME.

14. The one or more tangible, non-transitory computer-readable mediums of claim 13, wherein the bespoke sensor is to provide fine-grained compute or energy consumption data for the external workload.

15. The one or more tangible, non-transitory computer-readable mediums of claim 13, wherein the TCM agent is to provision the workload enclave within a scope selected from at least two different scopes, wherein each scope has different security features from the other scope.

16. The one or more tangible, non-transitory computer-readable mediums of claim 13, wherein the TCM agent is to provision a first workload enclave for a first workload, and a second workload enclave for a second workload, wherein the first workload enclave and second workload enclave are logically separate and mutually exclusive.

17. The one or more tangible, non-transitory computer-readable mediums of claim 13, wherein the bespoke sensor is to measure the external workload independently of the workload enclave and of an operating system.

18. The one or more tangible, non-transitory computer-readable mediums of claim 13, wherein the TCM agent is further to save data of the bespoke sensor as part of a workload state.

19. The one or more tangible, non-transitory computer-readable mediums of claim 13, wherein the TCM agent is further to snapshot and seal data from the bespoke sensor to the workload enclave based on a configurable event.

20. The one or more tangible, non-transitory computer-readable mediums of claim 13, wherein the TCM agent is further to convert raw data from the bespoke sensor into a billing-appropriate unit in a format different from the raw data.

21. The one or more tangible, non-transitory computer-readable mediums of claim 13, wherein the at least one parameter is selected from the group consisting of power consumption, processor cycles consumed, memory consumed, storage consumed, energy transmission, and volume of communication.

22. A method of providing a trusted compute meter (TCM) agent, comprising:

receiving an external workload for execution on a computing resource;

provisioning a workload enclave to execute the external workload within a first trusted execution environment (TEE) comprising a processor configured to provide instructions to provide trusted access to a memory enclave;

executing the external workload within the workload enclave using the computing resource; and measuring resource usage of the external workload via a bespoke sensor configured to measure at least one parameter of usage of the computing resource and to securely communicate with the TCM agent independently of a host operating system, wherein the bespoke sensor is wholly owned by the TCM agent and is restricted from interacting with other system resources, wherein the bespoke sensor is managed at a hardware level by a trusted meter management engine (TMME) in a second TEE, and wherein the TMME provides secure communication between the TCM agent of the first TEE and the TMME.

23. The method of claim 22, further comprising saving data of the bespoke sensor as part of a workload state.

* * * * *